United States Patent [19]

Hamano et al.

[11] Patent Number: 5,084,334
[45] Date of Patent: Jan. 28, 1992

[54] VOID-CONTAINING POLYESTER-TYPE FILM, AND ITS LAMINATE

[75] Inventors: Akito Hamano; Katsufumi Kumano; Katsuya Ito; Atsushi Taga; Katsuaki Kuze, all of Ohtsu; Tadashi Okudaira, Tsuruga; Kazuhiro Hattori, Ohtsu, all of Japan

[73] Assignee: Toyo Boseki Kabushiki Kaisha, Osaka, Japan

[21] Appl. No.: 682,654

[22] Filed: Apr. 9, 1991

[30] Foreign Application Priority Data

Apr. 10, 1990 [JP] Japan .................. 2-95941
Jan. 30, 1991 [JP] Japan .................. 3-32067

[51] Int. Cl.$^5$ ............................... B32B 3/26
[52] U.S. Cl. ..................... 428/304.4; 428/318.4; 428/319.3; 521/134; 521/138
[58] Field of Search ............... 428/304.4, 318.4, 319.3; 521/134, 138

[56] References Cited

FOREIGN PATENT DOCUMENTS 49-2016 1/1974 Japan .
49-134755 12/1974 Japan .
54-29550 9/1979 Japan .
58-28097 6/1983 Japan .

Primary Examiner—William J. Van Balen
Attorney, Agent, or Firm—Leydig, Voit & Mayer

[57] ABSTRACT

A void-containing polyester-type film is obtained by drawing a resin composition sheet consisting of a polyester, and a thermoplastic resin which is not compatible with the polyester in at least one direction. The film of this invention has a film base material consisting mainly of the polyester, fine particles consisting mainly of the thermoplastic resin which are dispersed into the film base material, and fine voids formed around the fine particles. The film of this invention has a surface layer having 3 μm or more thickness, a void percentage of 4% by volume or less in an area having 3 μm thickness from its surface, and an average void percentage of 8% by volume to 50% by volume.

The film of this invention has excellent softeness, lightness, and hiding power, and excellent surface strength. The film can be used as a base material for a label, etc.

17 Claims, 1 Drawing Sheet

VOID-CONTAINING POLYESTER-TYPE FILM, AND ITS LAMINATE

BACKGROUND OF THE INVENTION

1. Field of the Invention

The present invention relates to a polyester-type film that can be used as a base material for a label, poster, recording paper, wrapping paper, etc. In particular, it relates to a drawn polyester-type film containing a large number of fine voids, and a laminate using the film. The polyester-type film has enough surface strength to prevent its surface area from being peeled off when an adhesive tape sticks to its surface and is peeled off.

2. Description of the Prior Art

Synthetic papers which are made from synthetic resins as the main raw material are excellent in water resistance, dimensional stability due to moisture absorption, surface smoothness, gloss and distinctness when printing, and mechanical strength, compared to natural papers. Therefore, practical uses of synthetic papers have been developed in recent years by making use of these advantages.

As main raw material for the synthetic paper, polyethylene, polypropylene, polyesters, and the like are used. Especially, polyesters such as poly(ethylenetrephthalate) are excellent as raw material for synthetic paper because of high thermal resistance, and toughness, so it is possible to widely develop its uses.

The following processes have been proposed in a prior art for preparing a polyester film having similar functions to paper by using polyester as the main raw material:

(i) Containing a large number of fine voids inside the polyester film;
(ii) Treating the smooth surface of the polyester film by a sandblast technique to make the surface rough;
(iii) Treating the smooth surface of the polyester film by a chemical etching technique to make the surface rough; and
(iv) Treating the smooth surface of the polyester film by laminating a matt agent together with a binder to make the surface rough.

Among these processes, the aforementioned technique (i) has some advantages in that the film itself becomes light, and has suitable softness, thereby making it possible to print or transfer, distinctly.

In order to form fine voids inside the film, there has been proposed in the prior art a process comprising melt-kneading a polyester and a polymer which is not compatible with the polyester in an extruder, molding the kneaded material to form a sheet in which the polymer is dispersed in the polyester in the form of fine particles with this kneaded material, and then drawing the sheet to separate the fine particles from the polyester to form fine voids around the fine particles.

The polymers that can be used for the formation of the fine voids include polyolefin resins (for example, Japanese Laid-open Patent Publication No. 49-134755), polystyrene resins (for example, Japanese Patent Publications Nos. 49-2016 and 54-29550), and polyacrylate resins (for example, Japanese Patent Publication No. 58-28097), and so on. Among these polymers, polystyrene and polypropylene are preferred because fine voids are easily formed by using them.

However, a polyester film containing fine voids that is prepared by the aforementioned procedure (hereinafter referred to as a void-containing polyester film) has some disadvantages in that when an adhesive tape sticks to the surface of the film and is peeled off, the surface area is also peeled off. Also, when the surface of the void-containing film is worked to form an adhesive layer or laminated layer thereon for the preparation of a label or wrapping materials, the adhesive layer or laminated layer is susceptible to peeling from the film.

To solve these problems, a peeling-resistant layer is laminated on the surface of the film by a co-extrusion method, coat method, or laminate method. However, new equipment as well as complicated working processes are required to carry out these methods.

SUMMARY OF THE INVENTION

The void-containing polyester-type film, which overcomes the above-discussed and numerous other disadvantages and deficiencies of the prior art, is obtained by drawing a resin composition sheet containing at least a polyester, and at least a thermoplastic resin which is not compatible with said polyester in at least one direction, wherein said polyester-type film has a film base material consisting mainly of said polyester, fine particles consisting mainly of said thermoplastic resin which are dispersed into said film base material, and fine voids formed around said fine particles, wherein the void percentage of a surface layer having 3 m thickness from the surface of said polyester-type film is 4% by volume or less, and the average void percentage of said polyester-type film is 8% by volume to 50% by volume.

In a preferred embodiment, the void percentage of said surface layer is 0–3% by volume.

In a preferred embodiment, the average void percentage of said film is 8–30% by volume.

In a preferred embodiment, the thickness of said surface layer is 4–30 $\mu$m.

In a preferred embodiment, said fine particles are extended in the direction of the drawing of said sheet, the longitudinal diameter, the thickness, and the ratio of said longitudinal diameter to said thickness of said fine particles are 1 to 50 $\mu$m, 10 $\mu$m or less, and 2 to 100, respectively.

In a preferred embodiment, the longitudinal diameter, the thickness, and the ratio of said longitudinal diameter to said thickness of said fine particles are 3–40 $\mu$m, 1–7 $\mu$m, and 3–30, respectively.

In a preferred embodiment, the average particle size of the fine particles present in said surface layer is less than that of fine particles present in other parts of said film.

In a preferred embodiment, said thermoplastic resin is contained in the amount of 1 to 40% by weight based on the total amount of said resin composition.

In a preferred embodiment, said thermoplastic resin is contained in the amount of 5–30% by weight based on the total amount of said resin composition.

In a preferred embodiment, said thermoplastic resin is at least one selected from the group consisting of polystyrene-type resins, polyolefin-type resins, polyamide-type resins, polyacrylic-type resins, cellulose-type resins, petroleum resins, synthetic rubber, natural rubber, polycarbonate resins, polysulfone-type resins, polyacrylate-type resins, and polyether-type resins.

In a preferred embodiment, said thermoplastic resin is a polystyrene-type resin having 5.0% by weight or less of a n-hexane extract.

In a preferred embodiment, said polyester is obtained by reacting mainly ethylene glycol with terephthalic acid or a derivative thereof.

The laminate of this invention has an outer surface layer placed on at least one side of said void-containing polyester-ester film, wherein said outer surface layer is formed by applying a resin solution, a resin emulsion or a resin dispersion to said void containing polyester film.

In a preferred embodiment, said outer surface layer is formed by treating the surface of said film with an active energy radiation treatment so that a contact angle of said treated surface with water can be 90° or less, and applying a resin solution, a resin emulsion or a resin dispersion to said void containing polyester film.

In a preferred embodiment, said active energy radiation treatment is at least one selected from the group consisting of a corona discharge treatment, an ultraviolet radiation treatment, a plasma treatment, and an electron beam radiation treatment.

In a preferred embodiment, said void-containing polyester film or said outer surface layer contains an antistatic agent or a conductive material.

The laminate of this invention has an outer surface layer placed on at least one side of said void-containing polyester-ester film, wherein said outer surface layer is formed by applying a resin solution to said treated surface.

In a preferred embodiment, the outer surface layer is formed by treating the surface of said film with an active energy radiation treatment so that a contact angle of said treated surface with water can be 90° or less, and applying a resin solution to said treated surface, wherein the resulting film having said outer surface layer is drawn in one or two directions.

Thus, the invention disclosed herein makes possible the objectives of (1) providing a void-containing polyester-type film having excellent softness, lightness, and hiding power, compared to a drawn polyester-type film which does not contain any voids, substantially;

(2) providing a void-containing polyester-type film whose surface is resistant to peeling;

(3) providing a void-containing polyester-type film having suitable whiteness which makes it possible to print and type upon, distinctly;

(4) providing a void-containing polyester-type film which makes it possible to write upon with a pencil or ball-point pen because of a large number of projections formed on the surface of the film;

(5) providing a void-containing polyester-type film having a high surface strength by using single-layer extrusion equipment due to the fact that conventional laminating methods are not required to improve the surface strength;

(6) providing a void-containing polyester-type film that can be used as a base material for a label, poster, recording paper, wrapping paper, etc., and from which these products, having durability, can be prepared; and (7) providing a laminate having an improved wetting property, and adhesiveness to ink and coating agents.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The polyester that can be used in this invention is a thermoplastic polyester obtained by the polymerization reaction of terephthalic acid and/or derivatives thereof and ethylene glycol, which contains preferably 70 mole % or more of ethylene terephthalate units. The polyester can contain other dicarboxylic acid components, diol components, or oxycarboxylic acid components as copolymer components. Also, the polyester can contain other types of polyester such as polybutylene terephthalate, polyethylene-2,6-naphthalate, polycyclohexylene dimethylene terephthalate, and the like.

The polyester can be prepared by a melt polymerization of the aforementioned components according to a common technique. However, polyesters obtained by other polymerization methods are also available. The polymerization degree of the polyester is adjusted so that the resulting polyester has an intrinsic viscosity of 0.3 to 1.2.

The thermoplastic resin used in this invention which is not compatible with the polyester resin is dispersed in the polyester in a fine particle state by causing a phase separation from the polyester resin when it is melt-kneaded together with the polyester resin.

Preferably, the thermoplastic resin is difficult to be decomposed by heating and to be reacted with the polyester, when it is melt-extruded together with the polyester. Also, the thermoplastic resin is preferably dispersed in the polyester matrix in the form of fine particles having a particle size of 0.1 to 50 μm when it is mixed with the polyester. It is more preferred to use a thermoplastic resin causing separation on the interface between the film base material of the polyester and the fine particles to make it easier to form voids around the fine particles when the resin composition sheet containing the thermoplastic resin and the polyester is drawn to form a film.

The thermoplastic resins include for example polystyrene-type resins, polyolefin-type resins, polyamide-type resins, polyacrylic-type resins, cellulose-type resins, petroleum resins, synthetic rubber, natural rubber, polycarbonate resins, polysulfone-type resins, polyacrylate-type resins, polyether-type resins, and the like. Especially, polystyrene-type resins is preferred.

The polystyrene-type resins include polystyrene homopolymer obtained by the polymerization of styrene monomer, and polystyrene random copolymer, block copolymer, and graft copolymer obtained by the copolymerization of styrene and other monomers which contain mainly styrene repeating units. Also, the polystyrene-type resins include blends and polymer alloys prepared by combining the aforementioned polymers with other polymers. For example, the polystyrene-type resins include a non-crystalline polystyrene for general uses, a stereoregular crystalline polystyrene (i.e., syndiotactic crystalline polystyrene, an isotactic crystalline polystyrene), an impact resistant polystyrene, acrylonitrile-styrene copolymer, acrylonitrile-butadiene-styrene copolymer, and the like.

Especially, a polystyrene-type resin having 5.0% by weight or less of a n-hexane extract is preferred.

The polystyrene-type resins that are usually used as raw materials for molding contain a large amount of additives (reforming agents, polymerization catalysts, etc.) for the purpose of improving its mold release property, fluidity inside a mold, extrusion property, and sliding property, and preventing thermal deterioration, and oxidation deterioration, or forming an emulsion or suspension during polymerization.

These additives include for example higher fatty acids, their esters, amides, metal salts; higher aliphatic alcohols; liquid paraffin; silicone oil; and the like. Also, the polystyrene-type resin contains low molecular weight polystyrene, and monomers.

When the polystyrene-type resin is molded, or the molded film is drawn, or the drawn film is treated by heat, the additives may be oozed into the surface of the film, thereby reducing significantly the wetting property of the surface of the film. When ink or a coating agent is coated on the surface of the film, the surface may shed it, or unevenness of the coated film may occur. The coated film is less adhesive to the film. Although the wetting property of the film is improved by washing the oozed materials with an organic solvent, after washing the materials are oozed again, so that the wetting property and adhesiveness of the film will be reduced.

By using a polystyrene-type resin having 5.0% by weight or less of a n-hexane extract, the aforementioned problem can be solved.

The polystyrene-type resin having 5.0% by weight or less of a n-hexane extract used in this invention can be obtained by the following procedure: (i) washing the polystyrene-type resin obtained by an ordinary technique such as bulk polymerization, emulsion polymerization, suspension polymerization, etc. with a non-polar organic solvent such as n-hexane, n-heptane, etc., in which the polystyrene-type resin is insoluble; or (ii) extruding the polystyrene-type resin in an extruder to form resin chips while evacuating with a vacuum ventilator.

As a matter of course, when the polystyrene-type resin is formed by polymerization, and it is extruded to form the resin chips in a extruder, it is desirable that the additives which reduce its wetting property not be added.

For example, a resin composition sheet containing the polyester and the thermoplastic resin can be prepared by the following procedure: (i) mixing the polyester chips with the thermoplastic resin chips, melt-kneading them in an extruder to form a resin composition, extruding the resin composition to form a sheet, and solidifying the sheet; (ii) kneading the polyester and the thermoplastic resin in a kneader, melting and extruding the resulting resin composition in an extruder to form a sheet, and solidifying the sheet; and (iii) adding the thermoplastic resin to the polyester in the polymerization process of the polyester to disperse the thermoplastic resin into the polyester, and then melt-extruding the resin composition in an extruder to form a sheet, and solidifying the sheet.

In the solidified resin composition sheet, the polyester is usually not oriented, or weakly oriented. The fine particles of the thermoplastic resin are dispersed in the polyester matrix in various forms such as spherical, oval, wire-shaped, and the like. When the fine particle has a sphere shape, its diameter is preferably 0.1 to 30 $\mu$m. Also, the average particle size of the fine particles present in the surface layer of the sheet is preferably less than that of fine particles present in other parts of the sheet.

The resin composition sheet of which the surface layer contains fine particles having a different particle size from that in the other parts can be prepared by controlling the viscoelasticity of the polyester and the thermoplastic resin when melting them, and the extrusion conditions of the extruder.

For example, if a higher shearing stress than usual is applied to the melted resin composition at a slit of an extrusion die, the particle size of the fine particles around the surface layer of the resin composition is one-tenth or less as large as those obtained under ordinary conditions while maintaining the particle size of the fine particles present around the core of the resin composition.

The resin composition can contain coloring agents such as pigments, dyes, etc.; photo-deterioration inhibitor; thermal deterioration inhibitor; antistatic agent; conductive material; fluorescent agent; and the like. The resulting resin composition sheet is drawn in at least one direction to form a void-containing polyester-type film.

The sheet is drawn in one direction by, for example, the following procedures: (i) passing the sheet between two or more rolls each having a different rotation rate to draw the sheet (roll drawing technique); (ii) fixing the edges of the sheet with two or more clips, and then extending the sheet (tenter drawing technique); and (iii) drawing the sheet under air pressure (inflation drawing technique); and the like.

Figure 1:
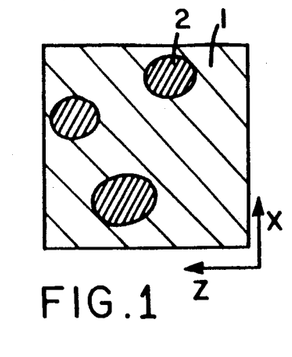
FIG. 1 is a sectional view of a main part of the non-drawn sheet used in this invention in the direction of its thickness.
Figure 2:
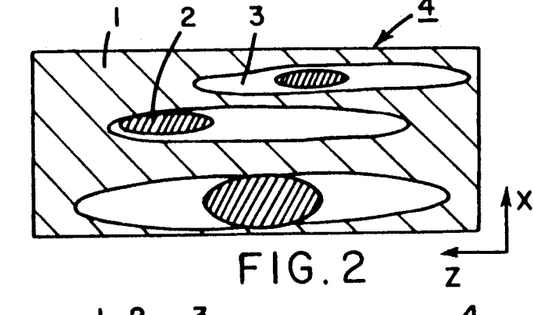
FIG. 2 is a sectional view of a main part of the void-containing polyester film in the direction of its thickness, which is obtained by drawing the sheet of FIG. 1 in the direction of the Z axis and Y axis (i.e., the direction which is at a right angle with the figure)
Figure 3:
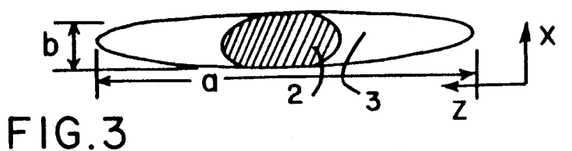
FIG. 3 is a sectional view of fine particles and voids present in the film of FIG. 2.
Figure 4:
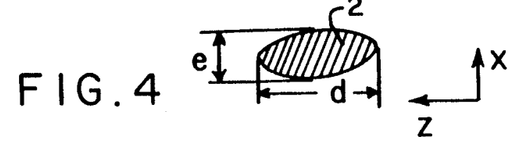
FIG. 4 is a sectional view of fine particles present in the film of FIG. 2.
Figure 5:
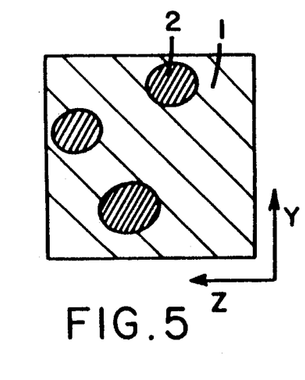
FIG. 5 is a sectional view of a main part of the non-drawn sheet used in this invention in a parallel direction with its surface.
Figure 6:
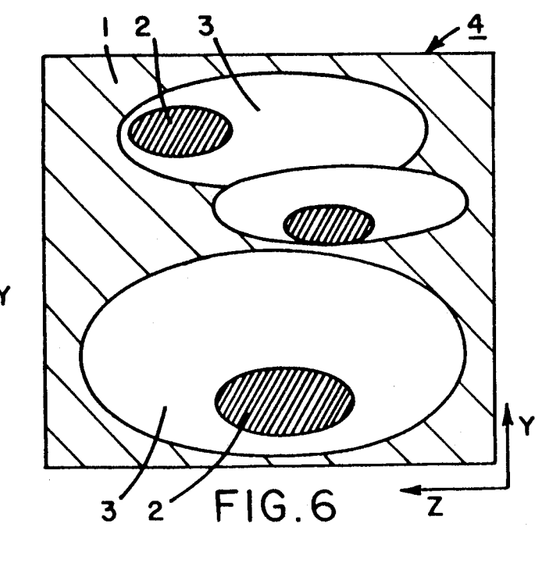
FIG. 6 is a sectional view of a main part of the void-containing polyester film in a parallel direction with its surface, which is obtained by drawing the sheet of FIG. 5 in the direction of the Z axis (i.e., the direction at a right angle with the figure) and the Y axis.
Figure 7:
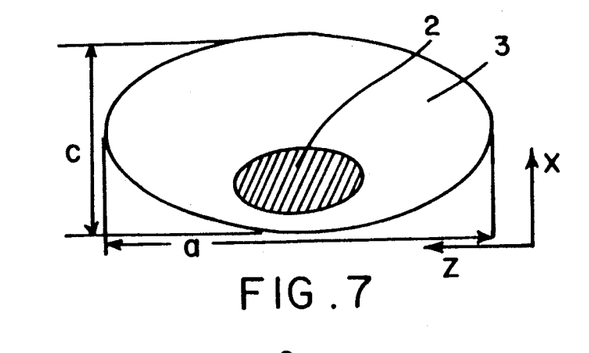
FIG. 7 is a sectional view of fine particles and voids present in the film of FIG. 5.
Figure 8:
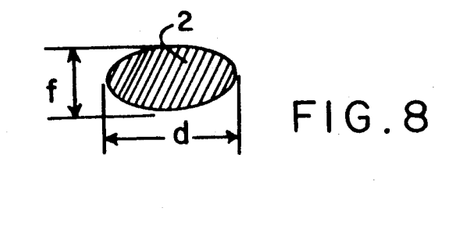
FIG. 8 is a sectional view of fine particles present in the film of FIG. 5.

When the sheet is drawn in one or two direction by the aforementioned procedure, film base material 1 as shown in FIGS. 1 to 8 is extended toward the drawing direction. Then, fine particles 2 of the thermoplastic resin present in the film base material 1 are deformed, and at the same time the separation occurs on the interface between the film base material 1 and the fine particles 2, thereby forming voids 3 around the fine particles 2. The voids 3 are formed between the fine particles 2 and the film base material 1. For that reason, the more fine particles 2 that are present in the film base material 1, the more voids 3 are formed. Also, the larger the particles size of the fine particles 2 becomes, the larger voids 3 are formed.

The amount of the thermoplastic resin contained in the resin composition, varies depending on the desirable number of voids 3, and is preferably 1 to 40% by weight, more preferably 5-30% by weight based on the total amount of the resin composition. If the amount of the thermoplastic resin is less than 1% by weight, because the limited number of the voids 3 are formed, a polyester-type film having desirable softness, lightness and drawing property cannot be obtained. On the other hand, if the amount of the thermoplastic resin is more than 40% by weight, because the voids 3 is formed exceedingly the thermal resistance and strength of the polyester-type film will be significantly damaged. Also, a void-containing polyester-type film with high surface hardness on which the surface layer is resists being peeled off cannot be obtained.

The resulting void-containing polyester-type film 4 of this invention has a film base material 1 consisting mainly of the polyester, fine particles 2 consisting mainly of the thermoplastic resin which are dispersed into the film base material 1, and fine voids 3 formed around the fine particles 2.

Preferably, the longitudinal diameter d, the thickness e, and the ratio of the longitudinal diameter d to the thickness e of the fine particles 2 are 1 to 50 $\mu$m, 10 $\mu$m or less, and 2 to 100, respectively. More preferably, the longitiudinal diameter d, the thickness e, and the ratio of the longitudinal diameter d to the thickness e of the fine particles 2 are 3–40 $\mu$m, 1–7 $\mu$m, and 3–30, respectively.

If the longitudinal diameter d and the thickness e of the fine particles 2 of the thermoplastic resin are more than 50 $\mu$m, and more than 10 $\mu$m, respectively, because of a large volume of the voids 3 formed, the strength of the film 4 will be decreased in the direction of its thickness x, so that the surface layer of the film may be peeled off, or the film may be broken when it is prepared. Also, if the ratio of the longitudinal diameter d to the thickness e of the fine particles 2 is less than 2, because of the small contact area between the film base material 1 and the fine particles 2, the strength of the film 4 will be decreased in the direction of its thickness x, so that the surface layer of the film may be peeled off. Moreover, if the longitudinal diameter d of the fine particles 2 is less than 1 $\mu$m, or the ratio of the longitudinal diameter d to the thickness e of the fine particles 2 is more than 100, the void percentage will be undesirably reduced.

In the figures, a is the longitudinal diameter of the void, b is the thickness of the void, c is the minor axis diameter of the void, and f is the minor axis diameter of the fine particle.

The drawing conditions of the resin composition sheet are closely related to the production of the voids. For example, when the resin composition sheet is drawn by a continuous biaxial stretching process which is the most common process, the following conditions are proposed. When the resin composition is drawn by a roll drawing technique in the direction of its length, and then by a tenter drawing technique in the direction of its width, the temperature and the draw ratio in the roll drawing process are preferably 50° to 140° C. and 1.2 to 5, respectively, and the temperature and the draw ratio in the tenter drawing process are preferably 60° to 150° C. and 1.2 to 5, respectively.

It is possible to form a void-containing film of which the surface layer has less void percentage than the other parts by controlling the temperature of the resin composition sheet so that the temperature of the surface layer can be higher than the other parts of the sheet.

Normally, the void-containing film obtained by drawing in one direction has better surface strength and peeling resistance than that obtained by drawing in two directions. However, the void-containing film obtained by drawing in two directions is more preferred in that they have uniform mechanical strength and uniform thickness in both directions.

Additionally, when the drawn void-containing film is treated by heat at a temperature of 130° C. or more, preferably 180° C. or more, its dimensional stability in high temperatures may be improved. Generally, this heat treatment may reduce the void size formed by the drawing procedure. Therefore, when the surface layer of the film is treated at a higher temperature than the other parts of the film, only the size of the voids present in the surface layer will be reduced.

The resulting void-containing polyester-type film has a surface layer having 3 $\mu$m or more thickness. The void percentage of an area having 3 $\mu$m thickness from the surface of the polyester-type film is 4% by volume or less, and the average void percentage of the polyester-type film is 8% by volume to 50% by volume.

If the void percentage of an area (a surface) having 3 $\mu$m thickness from the surface of the polyester-type film is more than 4% by volume, the surface layer of the film may be peeled off easily because of less surface strength. Also, the thickness of the area having 4% by volume or less void percentage is less than 3 $\mu$m, because the surface strength of the film is not increased sufficiently, the surface layer of the film does not have enough strength against peeling. Therefore, there is a requirement in this invention that the thickness of the surface layer of the void-containing polyester-type film is 3 $\mu$m or more, and the void percentage of an area having 3 $\mu$m thickness from the surface of the polyester-type film is 4% by volume or less. Especially, the thickness of the surface layer is preferablyy 4–30 $\mu$m, and the void percentage of the area is preferably 0–2% by volume.

The average void percentage of the polyester-type film must be 8% by volume to 50% by volume, preferably 8–30% by volume. If the average void percentage is less than 8% by volume, the resulting void-containing film does not have enough softness as well as lightness, thereby making it impossible to print and transfer, distinctly. On the other hand, it is difficult to prepare a void-containing polyester-type film having an average void percentage of more than 50% by volume because the film often breaks during the drawing process. The resulting film does not have enough strength against peeling as well as tensile force.

Additionally, when an outer surface layer is placed on at least one side of the void-containing polyester-ester film of this invention, a laminate having improved wetting property and adhesiveness to ink and coating agents can be obtained.

The outer surface layer can be formed by applying a resin solution, a resin emulsion or a resin dispersion to the surface of the film, and then drying the coated surface. As the resin used for the formation of the outer surface layer, common resins for improving the adhesiveness to ink and coating agents are employed, including for example polyester-type resins, polyurethane-type resins, polyesterurethane-type resins, acrylic-type resins, and the like, with polyester-type resins being preferred.

Conventional procedures can be used for the formation of the outer surface layer, including for example a gravure coating method, a kiss coating method, a dip method, a spray coating method, a curtain coating method, an air knife coating method, a blade coating method, a reverse roll coating method, and the like.

The outer surface layer is formed (i) on the surface of the sheet before the sheet drawing process; (ii) on the surface of the void-containing film which is drawn in one direction before drawing at a right angle in the other direction; or (iii) on the surface of the drawn void-containing film.

The thickness of the outer surface layer, varied depending on its purpose, is normally 0.01 to 10 μm. The outer surface layer may contain coloring agent, matt agent, antistatic agent, ultraviolet radiation absorbent, crosslinking agent, and the like.

When the outer surface layer is formed on the film as described above, the surface of the film is preferably treated with an active energy radiation treatment so that a contact angle of the treated surface with water can be 90° or less.

If the contact angle of the treated surface with water is more than 90°, the treated surface sheds the resin solution, thereby making it difficult to apply the solution to the treated surface, uniformly. Also, the resulting laminate is poorly adhesive to ink and coating agents.

The active energy radiation treatment includes a corona discharge treatment, an ultraviolet radiation treatment, a plasma treatment, an electron beam radiation treatment, and the like.

The corona discharge treatment, ultraviolet radiation treatment, and electron beam radiation treatment have an advantage because they are carried out under a non-vacuum atmosphere. Especially, the corona discharge treatment, and ultraviolet radiation treatment are advantageous for productivity and economical reasons. The corona discharge treatment and ultraviolet radiation treatment can be carried out under a specific gas atmosphere such as nitrogen, carbon dioxide, etc., as well as air.

A polyester containing mainly ethylene terephthalate repeating units is preferably used as a film base material in this invention. This is because the resulting void-containing polyester-type film has satisfactory thermal resistance and mechanical strength by using this type of polyester. Then, the polyester is mixed with the thermoplastic resin to obtain a resin composition sheet of this invention. By this procedure, the fine particles of the thermoplastic resin are dispersed in the polyester. Then, the dispersed fine particles cause the separation from the polyester base material during a drawing process to form voids around the fine particles.

The resin composition sheet is drawn in at least one direction to form a number of fine voids inside the sheet. When a number of fine voids are formed in the film, the film becomes lighter, so that the price per area will be lower. Also, the void-containing film has more softness, thereby making it possible to print and type upon, distinctly. Moreover, the void-containing film has whiteness as well as hiding power against light. A large number of projections formed on the surface of the film makes it possible to write with a pencil or ball-point pen.

The void percentage of an area having 3 μm thickness from the surface of the polyester-type film of this invention is 4% by volume or less to increase a resistance of the film surface, leading to the increase a resistance of the strength against peeling. On the other hand, the average void percentage of the polyester-type film is 8% by volume or more to give the film enough softness to make it possible to print or transfer, distinctly.

In order to provide less void percentage in the surface layer of the film than the other parts of the film, it is effective to make the average particle size of the fine particles present in the surface layer less than that of fine particles present in other parts of the film.

It seems that the fine particles present in the surface layer of the film have different particle sizes from those in the other parts of the film because of the shearing stress of the extrusion die.

The resulting void-containing polyester-type film of this invention is more resistant against peeling due to higher surface strength, compared to the same type of film having void uniformity. Also, because the void-containing polyester-type film has improved wetting property and adhesiveness to ink and the like, it can be used as a base material for a labels, posters, recording paper, wrapping paper, etc. which are resist against peeling off because of high surface strength.

EXAMPLES

The following illustrates the examples and comparative examples of this invention.

The measurements and evaluations used in these examples are described below:

(1) Intrinsic Viscosity of Polyester

Polyester is dissolved into a mixed solvent of phenol (6 parts by weight), and tetrachloroethane (4 parts by weight). The intrinsic viscosity of this polyester solution is measured at 30° C.

(2) Melt Flow Index of Polystyrene-Type Resin

The melt flow index of polystyrene-type resin is measured at 200° C. under a 5 kg load according to the procedure of JIS K-7210.

(3) Void Percentage of Surface Layer of the Void-Containing Film

A photograph of the sectional view of the film around surface is taken by scanning electron microscope. Then, the voids present in the area having 3 μm thickness from the surface are traced into a tracing film, and painted out. The resulting figure is analyzed by an image analyzer to calculate a void percentage (% by volume).

Scanning Electron Microscope

S-510 type scanning electron microscope manufactured by HITACHI Co., Ltd.

Image Analyzer

Luzex IID manufactured by Nireco Co., Ltd.

(4) Void Percentage of the Other Parts of Void-Containing Film

The void percentage of the area having about 20 μm thickness from the surface is measured by the same procedure as in (iii).

(5) Apparent Specific Gravity of Film

The film is cut into 5.00 cm × 5.00 cm square sample. The average thickness t(cm) of the sample is measured. Then, the average weight of the sample is measured. The apparent specific gravity of the film is calculated by the following formula:

$$\text{Apparent specific gravity} = W/5 \times 5 \times t$$

(6) Average Void Percentage of Film

The average void percentage of film is calculated by the following formula:

Average void percentage (% by volume) = $100 \times (1 - \text{true specific volume} / \text{apparent specific volume})$ wherein
True specific volume = $x_1/d_1 + x_2/d_2 + x_3/d_3 + \cdots + x_i/d_i + \cdots$ Apparent specific volume = 1/apparent specific gravity of the film,
wherein $x_i$ is a weight fraction of component i, and $d_i$ is a true specific gravity of component i.

The true specific gravity used in the examples is 1.40 for polyethylene terephthalate, 3.90 for anataze-type titanium dioxide, 1.05 for general polystyrene resin, and 0.91 for crystalline polypropylene.

(7) Hiding Power of Void-Containing Film

Light transmittance of the film is measured by Poic integration sphere H.T.R. meter manufactured by Nihon Seimitsu Kogaku Co., Ltd. according to the procedure of JIS K6714. The lower light transmittance means higher hiding power. Commercially available pulp paper for electrostatic copy has a light transmittance of 27%.

(8) Surface Strength of the Film Against Peeling

Using a cellophane tape with an 18 mm width manufactured by Nichiban Co., Ltd., the surface strength of the film is measured by a cellophane tape peeling test. The cellophane tape sticks to the film and is peeled off in the direction at the angle of 150°.

The appearance of the surface of the void-containing film after peeling is classified as described below:
Class 5—All the parts of the surface layer are peeled off;
Class 4—Most parts of the surface layer are peeled off;
Class 3—About a half of the surface layer is peeled off;
Class 2—Most parts of the surface layer are not peeled off;
Class 1—None of the surface layer is peeled off.

9) The Water Bead Contact Angle

The water bead contact angle was measured by means of a contact-angle measuring apparatus CA-A (manufactured by KYOWA KAGAKU CO., Ltd.) in an atmosphere of 20° C., 60% RH. The smaller the measured value is, the better the wetting property of the void-containing film surface to an aqueous ink or a polar solvent type ink.

10) Shedding of an Aqueous Ink Applied to the Film

An aqueous ink of aqua-color 39 indigo (manufactured by TOYO INK CO., Ltd.) was applied to the surface of the void-containing film by means of a gravure coating machine so that the ink layer after being dried is a thickness of 3 μm. After applying the ink and drying the film, shedding of the ink was visually observed and evaluated as to whether shedding of the ink occurred or not.

11) Adhesiveness of an Ink Layer to the Surface of the Void-Containing Film

By the use of the void-containing film with an aqueous ink layer prepared in according to the process 10), the adhesiveness of the ink layer to the film was examined by a cellophane tape peeling test.

The cellophane tape adhered to the void-containing film kept even and was peeled off the film in the direction at an angle of 150°, after which the area of the film surface where the ink layer remained was measured by means of an image-processing apparatus LUZEX II D (manufactured by NIREKO CO., Ltd.). The measurement was denoted by %.

The test indicated that the larger the measured value is, the stronger the adhesiveness of the ink layer to the void-containing film.

EXAMPLE 1

A resin composition consisting of 86% by weight of polyethylene terephthalate having an intrinsic viscosity of 0.62, 10% by weight of common polystyrene having a melt flow index of 1.8 g/10 minutes, and 4% by weight of anataze-type titanium dioxide was melt-extruded at 285° C. at the average flow rate of 8.5 m/second from a T die having a 1.0 mm slit of a twin-screw extruder, adhered to the surface of a cooling roll by electrostatic force, and solidified to obtain a non-drawn sheet having about 600 μm thickness.

Then, the non-drawn sheet was drawn at 80° C. by a roll stretching machine at the draw ratio of 3.5 in the direction of its length, and then at 130° C. by a tenter at the draw ratio of 5 in the direction of its width, and fixed at 220° C. by heat while relaxing the sheet at the rate of 3%.

The void percentage of the surface layer of the resulting void-containing film was 1% by volume, and the void percentage of the other parts is 18% by volume. Also, the average void percentage of the film was 16% by volume.

The thickness of the surface layer was about 5 μm. As described in Table 1, the void-containing film obtained in this example had a higher surface strength.

When the non-drawn sheet of this example was observed by a scanning electron microscope, the average particle size of the fine particles of the polystyrene present in the surface layer was 4.8 μm, and the average particles size of those present in the other parts was 0.6 μm.

EXAMPLE 2

A non-drawn sheet having about 1200 μm thickness was obtained by the same procedure as in Example 1 except that the amount of the melted resin composition extruded from the T die was increased. Then, the sheet was drawn, and fixed by heat according to the procedure of Example 1 to obtain a void-containing film having about 105 μm thickness.

The void percentage of the surface layer of the resulting void-containing film was 1% by volume, and the void percentage of the other parts was 18% by volume. Also, the average void percentage of the film was 17% by volume. The thickness of the surface layer was about 8 μm. As described in Table 1, the void-containing film obtained in this example had a higher surface strength.

COMPARATIVE EXAMPLE 1

A non-drawn sheet having about 600 μm thickness was obtained by the same procedure as in Example 1 except that the slit length of the T die was 4.0 mm, and the average flow rate of the melted resin composition was 8.5 m/second. Then, the sheet was drawn, and fixed by heat according to the procedure of Example 1 to obtain a void-containing film having about 600 μm thickness.

The void percentage of the surface layer of the resulting void-containing film was 12% by volume, and the void percentage of the other parts was 20% by volume. Also, the average void percentage of the film was 19% by volume. The void-containing film obtained in this example has a lower surface strength.

When the non-drawn sheet of this comparative example was observed by a scanning electron microscope, the fine particles of the polystyrene are dispersed uniformly. The average particle size of the fine particles was 5.9 μm.

COMPARATIVE EXAMPLE 2

A non-drawn sheet having about 1200 μm in thickness was obtained by the same procedure as in Comparative Example 1 except that the melted resin composition was adhered to the cooling roll at a rate half of that in Comparative Example 1. Then, the sheet was drawn, and fixed by heat according to the procedure of Comparative Example 1 to obtain a void-containing film having about 107 μm thickness.

The void percentage of the surface layer of the resulting void-containing film was 13% by volume, and the void percentage of the other parts was 18% by volume. Also, the average void percentage of the film was 18% by volume. The void-containing film obtained in this example had a lower surface strength.

EXAMPLE 3

A void-containing film having about 51 μm in thickness was obtained by the same procedure as in Example 1 except that a resin composition consisting of 90% by weight of polyethylene terephthalate resin having an intrinsic viscosity of 0.62, and 10% by weight of common polystyrene having a melt flow index of 1.8 g/10 minutes was used.

The void percentage of the surface layer of the resulting void-containing film was 1% by volume, and the void percentage of the other parts was 17% by volume. Also, the average void percentage of the film was 15% by volume. The thickness of the surface layer was about 6 μm. As described in Table 1, the void-containing film obtained in this example had a higher surface strength.

EXAMPLE 4

A void-containing film having about 103 μm in thickness was obtained by the same procedure as in Example 3 except that the amount of the melted resin composition extruded from the T die was increased.

The void percentage of the surface layer of the resulting void-containing film was 1% by volume, and the void percentage of the other parts was 16% by volume. Also, the average void percentage of the film was 15% by volume. The thickness of the surface layer was about 10 μm. As described in Table 1, the void-containing film obtained in this example had a higher surface strength.

COMPARATIVE EXAMPLE 3

Using the resin composition of Example 3, a non-drawn sheet having about 600 μm in thickness was obtained by the same procedure as in Comparative Example 1 except that the slit length of the T die was 4.0 mm, and the average flow rate of the melted resin composition was 8.7 m/second. Then, the sheet was drawn, and fixed by heat according to the procedure of Comparative Example 1 to obtain a void-containing film having about 52 μm in thickness.

The void percentage of the surface layer of the resulting void-containing film was 10% by volume, and the void percentage of the other parts was 17% by volume. Also, the average void percentage of the film was 16% by volume. The void-containing film obtained in this example had a lower surface strength.

EXAMPLE 5

A resin composition consisting of 82% by weight of polyethylene terephthalate having an intrinsic viscosity of 0.62, 8% by weight of anatase-type titanium dioxide, and 10% by weight of common polystyrene having a melt flow index of 3.0 g/10 minutes which is treated by washing with n-heptane and contained 0.9% by weight of n-hexane extract was melt-extruded at 285° C. from a T die of a twin-screw extruder, adhered to the surface of a cooling roll by electrostatic force, and solidified thereon, and then continuously drawn at 80° C. by a roll stretching machine at the draw ratio of 3.0 in the direction of its length, and at 130° C. by a tenter at the draw ratio of 3.2 in the direction of its width, and fixed at 220° C. by heat to obtain a white polyester film.

The resulting void-containing film had an average void percentage of 16% by volume, and a paper-like appearance, allowing it to be drawn upon with pencil. When the film was printed upon with an aqueous ink, it did not shed the ink. The film was also highly adhesive to the aqueous ink.

EXAMPLE 6

A void-containing film was obtained by the same procedure as in Example 5 except that the polystyrene containing 2.1% by weight of n-hexane extract was used instead of that containing 0.9% by weight of n-hexane extract.

The resulting void-containing film had an average void percentage of 16% by volume, and a paper-like appearance, allowing it to be drawn upon with pencil. When the film was printed upon with an aqueous ink, it did not shed the ink. The film was also highly adhesive to the aqueous ink.

EXAMPLE 7

A polystyrene containing 4.5% by weight of n-hexane extract was prepared by melt-extruding a common polystyrene at 250° C. from the nozzle of a twin-screw extruder equipped with a vacuum vent, cooling the extruded polystyrene to solidify, and then cutting the solidified polystyrene. A void-containing film was obtained by the same procedure as in Example 5 except that this polystyrene was used.

The resulting void-containing film had an average void percentage of 16% by volume, and a paper-like appearance, allowing it to be drawn upon with pencil. When the film was printed upon with an aqueous ink, it did not shed the ink. The film was also highly adhesive to the aqueous ink.

EXAMPLE 8

A void-containing film was obtained by the same procedure as in Example 5 except that a common polystyrene which was not treated was used instead of the polystyrene containing 0.9% by weight of n-hexane extract.

The resulting void-containing film had an average void percentage of 16% by volume, and a paper-like appearance, allowing it to be drawn upon with pencil. However, when the film was printed upon with an aqueous ink, it shed the ink. The film was also unsatisfactor in adhesiveness to the aqueous ink.

EXAMPLE 9

A void-containing film is obtained by the same procedure as in Example 5 except that the polystyrene containing 0.9% by weight of n-hexane extract was used in the amount of 20% by weight instead of 10% by weight, and the polyethylene terephthalate was used in the amount of 72% by weight instead of 83% by weight.

The resulting void-containing film had an average void percentage of 27% by volume, and a paper-like appearance, allowing it to be drawn upon with pencil. When the film was printing upon with an aqueous ink, it did not shed the ink. The film was also highly adhesive to the aqueous ink.

EXAMPLE 10

A void-containing film was obtained by the same procedure as in Example 9 except that a common polystyrene containing 6.9% by weight of n-hexane extract was used in the amount of 20% by weight.

The resulting void-containing film had an average void percentage of 27% by volume, and a paper-like appearance, allowing it to be drawn upon with pencil. However, when the film was printed upon with an aqueous ink, it shed the ink. The film was also unsatisfactory in adhesiveness to the aqueous ink.

EXAMPLE 11

A void-containing film was obtained by the same procedure as in Example 5 except that a crystalline polystyrene having a melt flow index of 2.5 g/10 minutes was used instead of the common polystyrene.

The resulting void-containing film had an average void percentage of 17% by volume, and a paper-like appearance, allowing it to be drawn upon with pencil. However, when the film was printed upon with an aqueous ink, it shed the ink. The film was also very poor in adhesiveness to the aqueous ink.

COMPARATIVE EXAMPLE 4

A white film was obtained by the same procedure as in Example 5 except that a resin composition consisting of 92% by weight of polyethylene terephthalate, and 8% by weight of titanium dioxide was used.

The average void percentage of the resulting film was 1% by volume, which makes it impossible to be drawn upon with pencil.

EXAMPLES 12 AND 13

A solvent-type polyester adhesive, Vylon (manufactured by Toyobo Co., Ltd.) was mixed with a polyurethane-type curing agent, Takenate D110N (manufactured by Takeda Pharmaceutical Co., Ltd.) at the weight ratio of 200 to 1. After the mixture was applied to the surface of the void-containing films obtained in Examples 5 and 8 by a gravure coater, the coated surface was dried to obtain laminates. The thickness of the coated layer for was both 0.2 μm. When the coated layer of the laminate obtained from the film of Example 5 (Example 12) printed upon with an aqueous ink, it did not shed the ink, and was very highly adhesive to the ink. On the other hand, when the coated layer of the laminate obtained from the film of Example 10 (Example 13) printed upon with an aqueous ink, it did not shed ink, but was unsatisfactory in adhesiveness to the ink.

EXAMPLES 14, 15, AND 16

To the surface of the films drawn by a roll stretching machine in the direction of their length in Examples 5, 8, and 11, a water dispersible-type polyester, Vylonal (manufactured by Toyobo Co., Ltd.) was applied by a knife coater, and then dried. Continuously, the films were drawn by a tenter in the direction of their width, and then fixed by heat to obtain laminates. The thickness of the coated layer of the laminates was all 0.2 μm. The thickness of the coated layer of the films before the drawing in the direction of their width was considered to be 0.6 μm. When, the coated layer of the laminate obtained from the film of Example 5 (Example 14) printed upon with an aqueous ink, it did not shed ink, and was very highly adhesive to the ink. When, the coated layer of the laminate obtained from the film of Example 8 (Example 15) printed upon with an aqueous ink, it shed ink slightly, and was unsatisfactorily adhesive to the ink. When, the coated layer of the laminate obtained from the film of Example 11 (Example 16) printed upon with an aqueous ink, it shed ink, and was very poor in adhesiveness to the ink.

The results of above Example and Comparative example are shown in Table 1 and 2.

TABLE 1

| | resin composition | | | Property of void containing film | | | | | | |
| | | | | Void percentage of surface layer (Volume %) | Void percentage of center layer (Volume %) | apparent specific gravity | average void percentage of film (Volume %) | Light transmittance (%) | surface strength | thickness (μm) |
| | polyester | polystyrene | titanium dioxide | | | | | | | |
| --- | --- | --- | --- | --- | --- | --- | --- | --- | --- | --- |
| Example 1 | 86 | 10 | 4 | 1 | 18 | 1.16 | 16 | 15 | class 2 | 52 |
| Example 2 | 86 | 10 | 4 | 1 | 18 | 1.15 | 17 | 7 | class 1 | 105 |
| Comparative Example 1 | 86 | 10 | 4 | 12 | 20 | 1.12 | 19 | 14 | class 5 | 54 |
| Comparative Example 2 | 86 | 10 | 4 | 13 | 18 | 1.13 | 18 | 7 | class 5 | 107 |
| Example 3 | 90 | 10 | 0 | 0.5 | 17 | 1.15 | 15 | 36 | class 1 | 51 |
| Example 4 | 90 | 10 | 0 | 0.5 | 16 | 1.15 | 15 | 22 | class 1 | 103 |
| Comparative | 90 | 10 | 0 | 10 | 17 | 1.11 | 16 | 21 | class 4 | 52 |

TABLE 1-continued

| | resin composition | | | Property of void containing film | | | | | | |
|---|---|---|---|---|---|---|---|---|---|---|
| | poly-ester | poly-styrene | titanium dioxide | Void percentage of surface layer (Volume %) | Void percentage of center layer (Volume %) | apparent specific gravity | average void percentage of film (Volume %) | Light trans-mittance (%) | surface strength | thick-ness (μm) |
| Example 3 | | | | | | | | | | |

TABLE 2

| | Thermoplastic resin | | Amount of titanium dioxide WT % | Thick-ness μm | Apparent specific gravity | Property of void containing film | | | | Aqueous ink | |
|---|---|---|---|---|---|---|---|---|---|---|---|
| | n-Hexane extract WT % | Amount WT % | | | | Average void percentage of film Volume % | Light trans-mittance % | Water bead contact angle Angle | | Shedding | Adhesive-ness % |
| Example 5 | GPS | 0.9 | 10 | 8 | 57 | 1.20 | 16 | 15 | 80 | | None | 70 |
| Example 6 | GPS | 2.1 | 10 | 8 | 57 | 1.20 | 16 | 15 | 85 | | None | 70 |
| Example 7 | GPS | 4.5 | 10 | 8 | 57 | 1.20 | 16 | 15 | 89 | | None | 40 |
| Example 8 | GPS | 6.9 | 10 | 8 | 57 | 1.20 | 16 | 15 | 97 | | Shed | 0 |
| Example 9 | GPS | 0.9 | 20 | 8 | 63 | 1.00 | 27 | 12 | 84 | | None | 65 |
| Example 10 | GPS | 6.9 | 20 | 8 | 63 | 1.00 | 27 | 12 | 99 | | Shed | 0 |
| Example 11 | PP | — | 10 | 8 | 58 | 1.15 | 17 | 13 | 104 | | Shed | 0 |
| Comparative Example 4 | — | — | 0 | 8 | 50 | 1.45 | 1 | 15 | 75 | | None | 65 |
| Example 12 | Coated layer is laminated on the film of Example 5 | | | | | | | | 82 | | None | 100 |
| Example 13 | Coated layer is laminated on the film of Example 8 | | | | | | | | 82 | | None | 20 |
| Example 14 | Coated layer is laminated on the film of Example 5 | | | | | | | | 60 | | None | 100 |
| Example 15 | Coated layer is laminated on the film of Example 8 | | | | | | | | 62~95 | | Shed | 10 |
| Example 16 | Coated layer is laminated on the film of Example 11 | | | | | | | | 60~105 | | Shed | 0 |

GPS: General polystyrene resin
PP: Crystalline polypropylene

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A void-containing polyester-type film obtained by drawing a resin composition sheet containing at least a polyester, and at least a thermoplastic resin which is not compatible with said polyester in at least one direction, wherein said polyester-type film has a film base material consisting mainly of said polyester, fine particles consisting mainly of said thermoplastic resin which are dispersed into said film base material, and fine voids formed around said fine particles, wherein the void percentage of surface layer having 3 μm thickness from the surface of said polyester-type film is 4% by volume or less, and the average void percentage of said polyester-type film is 8% by volume to 50% by volume.

2. The void-containing polyester-type film of claim 1, wherein the void percentage of said surface layer is 0-3% by volume.

3. The void-containing polyester-type film of claim 1, wherein the average void percentage of said film is 8-30% by volume.

4. The void-containing polyester-type film of claim 1, wherein the thickness of said surface layer is 4-30 μm.

5. The void-containing polyester-type film of claim 1, wherein said fine particles are extended in the direction of the drawing of said sheet, the longitudinal diameter, the thickness, and the ratio of said longitudinal diameter to said thickness of said fine particles are 1 to 50 μm, 10 μm or less, and 2 μm to 100 μm, respectively.

6. The void-containing polyester-type film of claim 5, wherein the longitudinal diameter, the thickness, and the ratio of said longitudinal diameter to said thickness of said fine particles are 3-40 μm, 1-7 μm, and 3-30, respectively.

7. The void-containing polyester-type film of claim 1, wherein the average particle size of the fine particles present in said surface layer is less than that of fine particles present in other parts of said film.

8. The void-containing polyester-type film of claim 1, wherein said thermoplastic resin is contained in the amount of 1 to 40% by weight based on the total amount of said resin composition.

9. The void-containing polyester-type film of claim 8, wherein said thermoplastic resin is contained in the amount of 5-30% by weight based on the total amount of said resin composition.

10. The void-containing polyester-type film of claim 1, wherein said thermoplastic resin is at least one selected from the group consisting of polystyrene-type resins, polyolefin-type resins, polyamide-type resins, polyacrylic-type resins, cellulose-type resins, petroleum resins, synthetic rubber, natural rubber, polycarbonate resins, polysulfone-type resins, polyacrylate-type resins, and polyether-type resins.

11. The void-containing polyester-type film of claim 1, wherein said thermoplastic resin is a polystyrene-type resin having 5.0% by weight or less of a n-hexane extract.

12. The void-containing polyester-type film of claim 1, wherein said polyester is obtained by reacting mainly ethylene glycol with terephthalic acid or a derivatives thereof.

13. A laminate having an outer surface layer placed on at least one side of the void-containing polyester film of claim 1,
wherein said outer surface layer is formed by applying a resin solution, a resin emulsion or a resin dispersion to said void containing polyester film.

14. The laminate of claim 13,
wherein said outer surface layer is formed by treating the surface of said film with an active energy radiation treatment so that a contact angle of said treated surface with water can be 90° or less, and applying a resin solution, a resin emulsion or a resin dispersion to said void containing polyester film.

15. The laminate of claim 14, wherein said active energy radiation treatment is at least one selected from the group consisting of a corona discharge treatment, an ultraviolet radiation treatment, a plasma treatment, and an electron beam radiation treatment.

16. The laminate of claim 13, wherein said void-containing polyester film or said outer surface layer contains an antistatic agent or a conductive material.

17. A laminate having an outer surface layer placed on at least one side of the void-containing polyester-ester film of claim 1,
wherein said outer surface layer is formed by treating the surface of said film with an active energy radiation treatment so that a contact angle of said treated surface with water can be 90° or less, and applying a resin solution to said treated surface,
wherein the resulting film having said outer surface layer is drawn in one or two directions.

* * * * *